June 28, 1927.
G. FIGLIETTI
1,633,889
AIRPLANE
Filed Nov. 29, 1926
2 Sheets-Sheet 1
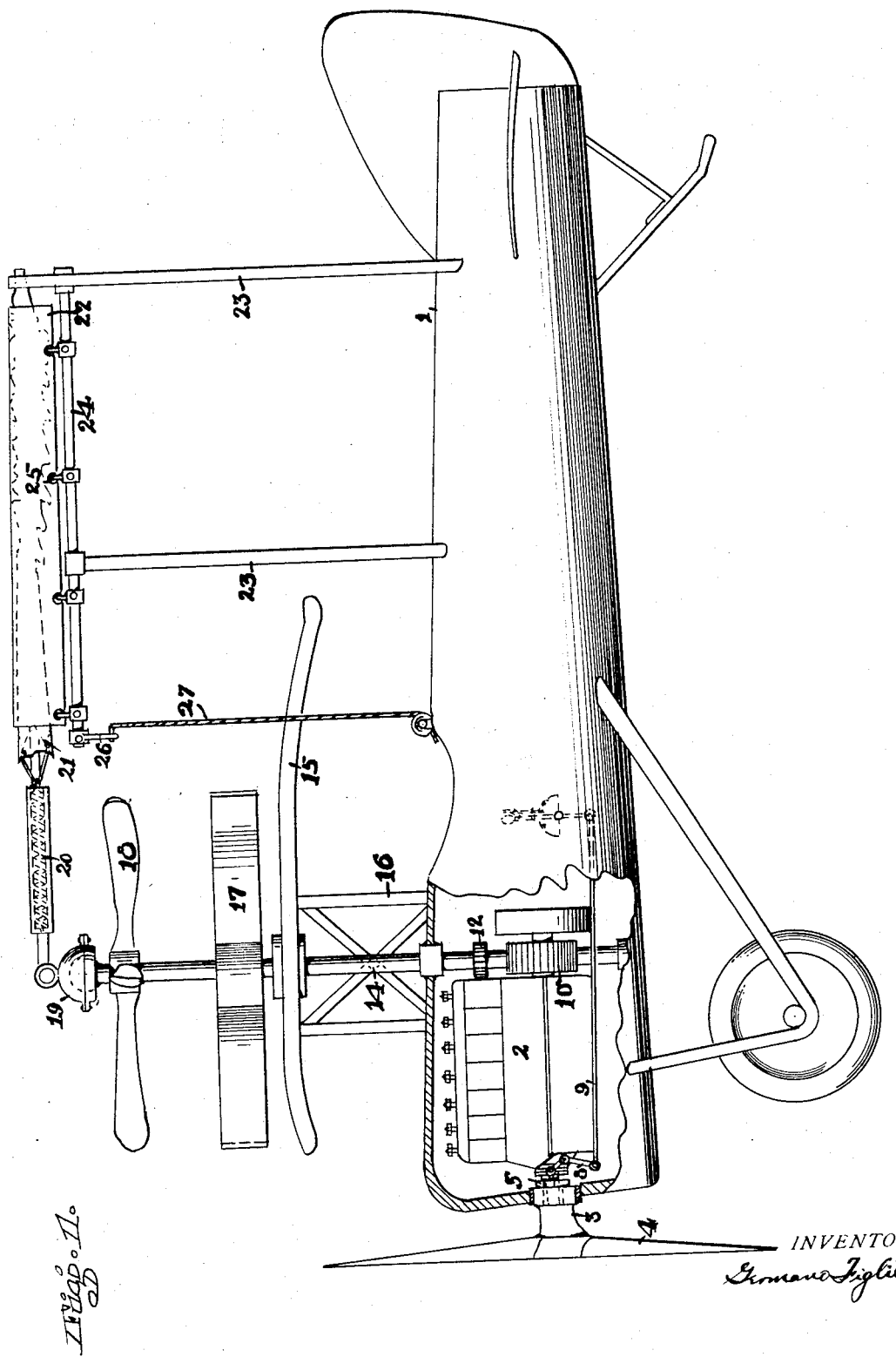
INVENTOR
Germano Figlietti

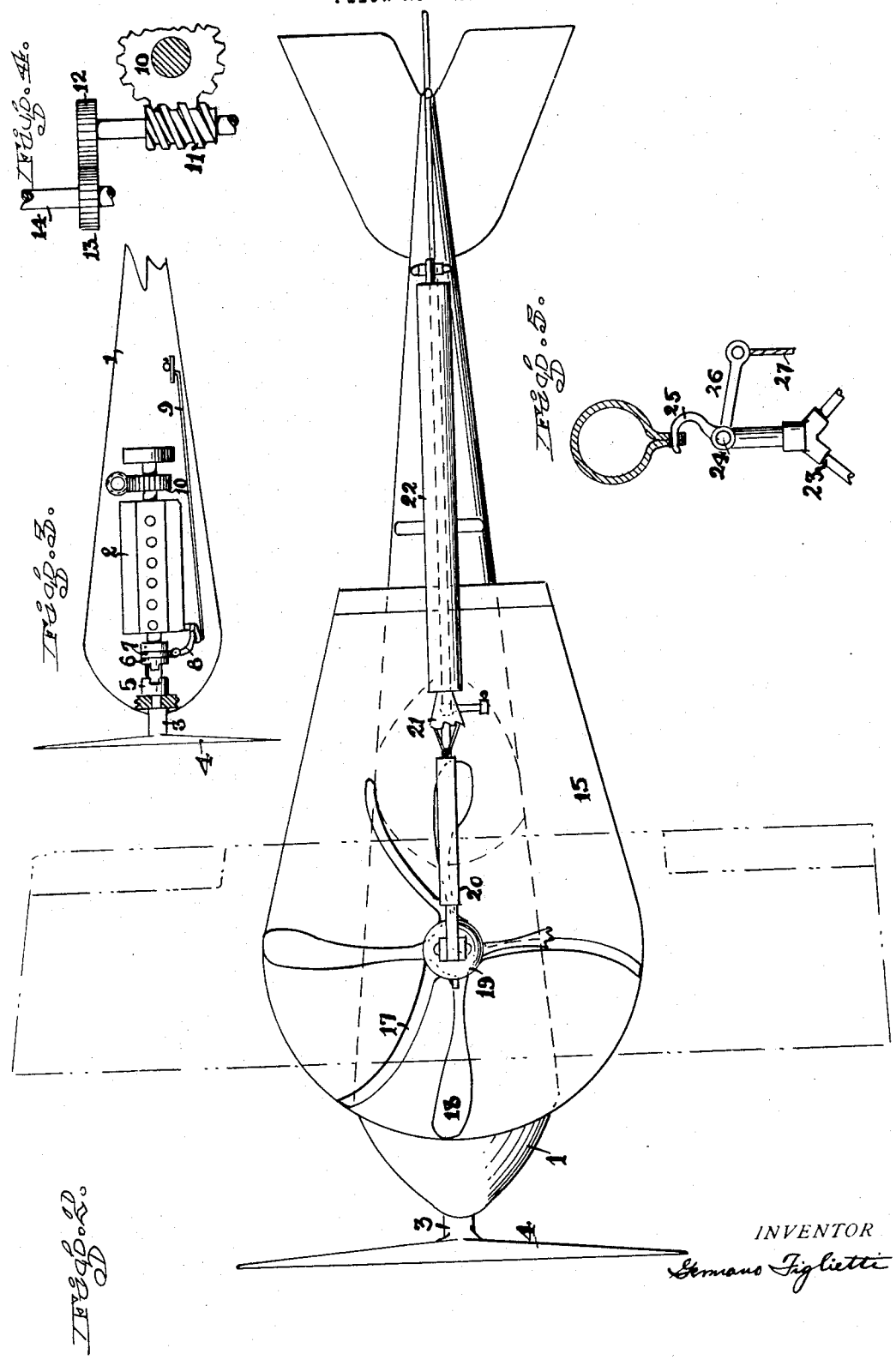

Patented June 28, 1927.

1,633,889

UNITED STATES PATENT OFFICE.

GERMANO FIGLIETTI, OF SAN FRANCISCO, CALIFORNIA.

AIRPLANE.

Application filed November 29, 1926. Serial No. 151,570.

This invention relates to improvements in airplanes, and has for its primary object to provide a construction for airplanes adapted to either cause the airplane to ascend vertically or lessen the speed of its descent.

A further object of this invention is to provide an airplane having a parachute attached above the same which may be easily released to provide a safe landing for the airplane in case of motor or other trouble.

A further object is to provide an airplane having a novel means attached thereto for absorbing or lessening the shock incident to the landing of the airplane.

A further object of this invention is to provide an airplane in which the forward propeller may be disengaged from the motor without the disengagement of the propellers located above the same.

In the accompanying drawings forming a part of this application:

Fig. 1 is a side view of an airplane embodying my invention;

Fig. 2 is a top view of the same;

Fig. 3 is a top view of the fuselage embodied in my invention, showing in detail the means for disengaging the front propeller from the motor;

Fig. 4 illustrates the location and shape of the gears used in transferring rotary motion from the motor to the propellers located above the fuselage; and Fig. 5 shows the means used in maintaining the parachute in a folded position, together with the means used in causing it to become unfolded.

Referring to the drawing, the numeral 1 represents the fuselage of an airplane, of the usual construction, having a motor 2 located therein near the front part. Rotatably extending through the front end of the fuselage is the axis 3 of a propeller 4. Secured to the axis 3, just inside the fuselage is a female clutch member 5, and secured to the shaft of the motor 2 is a male clutch member 6, which is adapted to rotate with the motor shaft. Loosely mounted on the motor shaft just behind the male clutch member is a ring 7 which has a lever 8 secured thereto. The lever 8 is suitably held in position within the fuselage by rods which are supported at their ends by the fuselage structure. An operating bar 9 is attached to the lever 8, and by pulling the same backwardly the male clutch member 6 is forced forwardly by the ring 7 into engagement with the female clutch member 5 attached to the axis of the propeller, thereby causing the propeller 4 to rotate with the motor shaft. By pushing the operating rod 9 forwardly the clutch members become disengaged and the shaft of the motor rotates independently of the propeller. Thus, in the event it is desired that the airplane not proceed in a forward direction with as much speed as ordinarily, the propeller 4 is disengaged from the motor shaft.

Connected to the motor shaft at the rear of the motor 2, is a gear 10 which meshes with a worm gear 11, and the axis of the worm gear is attached to a gear 12 which meshes with a similar gear 13, the last named gear being attached to a vertically extending driving rod 14. Thus through the gears described the motor shaft transfers rotary motion to the driving rod 14. The driving rod 14 is suitably supported in bearings located in the frame of the fuselage and by other bearings located in the wing 15, which is located above the fuselage and supported thereon by braces 16.

Secured to the driving rod 14 above the wing 15 is a propeller 17 which is adapted to create a vacuum and diminish the atmospheric pressure around the same when the same is rotated, and secured on the said driving rod above the propeller 17 is another propeller 18 which is adapted to also exert an upward pulling force when rotated. Thus when the two propellers 17 and 18 are rotated by driving rod 14 an upward pulling force is exerted which tends to cause the airplane to ascend.

Secured to the end of the driving rod 14 is a ball, encased at its top by a cap 19, which is suitably secured to the ball so that it can not be separated therefrom by jarring. The ball is adapted to rotate with the driving rod 14 independently of the cap 19. Pivotally connected to the top of cap 19 is a spiral spring 20, of durable construction, which is also attached to a parachute 21, the latter being foldable in an elongated container 22, which is longitudinally slit at its underneath side, so as to allow the parachute to be removed therefrom.

Secured to the fuselage are a plurality of upright supports 23, having a bar 24 movably held thereon. Secured to the bar 24 are a plurality of hooked members 25, the ends thereof being adapted to extend through holes located in the container 22 adjacent its longitudinally extending edges. A lever rod 26 is secured to the bar 24, and a rope 27 is fastened thereto, the same extending into the cockpit of the airplane where the driver is located. By pulling the rope 27 the lever rod 26 is moved downwardly thereby turning the bar 24 and moving the hooked members 25 so that they become disengaged from the container 22 and allow the parachute 21 to become unfolded. The parachute becomes unfolded quite readily once the container is opened, owing to the fact that the air catches its folds and opens the same. The usual controls located in the airplane and used to control the same are manipulated in the usual manner by the driver located in the cockpit. They have been omitted from the drawing for the sake of clearness and brevity.

The airplane herein shown and described may be operated in the usual manner, and the location of the propellers above the fuselage affords a satisfactory means for enabling it to descend with ease and grace. The parachute easily rendered operative by the manipulation of the controls therefor, furnishes a satisfactory means for allowing the airplane to descend safely in case of trouble while flying.

Having described my invention, what I claim is:

1. An airplane comprising a fuselage, a motor secured to the fuselage, a wing located above the fuselage and attached thereto, a lifting propeller adapted to raise the airplane, said propeller to be located above the wings, and to be rotatably connected to the motor, and an exhaust propeller rotatably connected to the motor and located between said lifting propeller and the wing, thereby to prevent the inrushing of the air below the lifting propeller and to maintain a low atmospheric pressure above the wing.

2. An airplane comprising a fuselage, a motor secured to the fuselage, a wing located above the fuselage and attached thereto, a first propeller adapted to change the atmospheric pressure above the wings, said propeller being rotatably connected to the motor, an expelling propeller rotatably connected to the motor and located between said first propeller and the wing, said expelling propeller being adapted to maintain a constant vacuum between said first propeller and the wing, and a front propeller connected to the motor and adapted to be disengaged therefrom.

3. An airplane comprising a fuselage, a motor secured to the fuselage, a wing located above the fuselage and attached thereto, a first propeller adapted to change the atmospheric pressure above the wings, said propeller being rotatably connected to the motor, an expelling propeller rotatably connected to the motor and located between said first propeller and the wing, said expelling propeller being adapted to maintain a constant vacuum between said first propeller and the wing, a front propeller connected to the motor and adapted to be disengaged therefrom, and a parachute, a ball and socket joint to secure said parachute to the end of the propeller, a cover to hold the parachute out of the center line of said propellers when the parachute is in inoperative position, hooks to secure said cover to the fuselage, and a lever to pull said hooks out of the cover thereby disengaging said cover and permitting the parachute to open up and to be turned above the propeller.

4. An airplane comprising a fuselage, a motor secured to the fuselage, a wing located above the fuselage and attached thereto, a vertically disposed shaft, bearings attached to the fuselage to rotatably support the shaft, transmission gearing to rotatably connect the shaft to the motor, a lifting propeller fixedly secured to the upper end of the shaft, an exhausting propeller fixedly secured to the shaft between said first propeller and the wing and adapted to centrifugally expel the inrushing air above the wing, and a front propeller rotatably connected to the motor.

GERMANO FIGLIETTI.